(12) United States Patent
Jones

(10) Patent No.: US 9,476,758 B2
(45) Date of Patent: Oct. 25, 2016

(54) HANDHELD DEVICES AND METHODS FOR ACQUIRING OBJECT DATA

(71) Applicant: Robert A. Jones, Raleigh, NC (US)

(72) Inventor: Robert A. Jones, Raleigh, NC (US)

(73) Assignee: Robert A. Jones, Raleigh, NC (US)

( * ) Notice: Subject to any disclaimer, the term of this patent is extended or adjusted under 35 U.S.C. 154(b) by 3 days.

(21) Appl. No.: 14/252,369

(22) Filed: Apr. 14, 2014

(65) Prior Publication Data

US 2015/0294641 A1  Oct. 15, 2015

(51) Int. Cl.
| | |
|---|---|
| G06T 11/00 | (2006.01) |
| G01G 19/60 | (2006.01) |
| G01G 23/37 | (2006.01) |
| G06T 1/00 | (2006.01) |
| G06F 3/14 | (2006.01) |

(52) U.S. Cl.
CPC .......... *G01G 23/3735* (2013.01); *G01G 19/60* (2013.01); *G06T 1/0007* (2013.01); *G06F 3/14* (2013.01); *G09G 2370/16* (2013.01)

(58) Field of Classification Search
None
See application file for complete search history.

(56) References Cited

U.S. PATENT DOCUMENTS

| | | | |
|---|---|---|---|
| 4,864,763 A * | 9/1989 | Peikin | 43/18.1 R |
| 5,031,710 A | 7/1991 | Parker et al. | |
| 5,986,222 A * | 11/1999 | Helberg | G01G 19/14 |
| | | | 177/148 |
| 6,696,650 B2 | 2/2004 | Muller et al. | |
| 6,765,155 B1 | 7/2004 | Gray | |
| 2007/0171046 A1* | 7/2007 | Diem | 340/539.13 |
| 2008/0029313 A1* | 2/2008 | Lentine | 177/148 |
| 2009/0049004 A1* | 2/2009 | Nurminen et al. | 707/1 |
| 2010/0051353 A1* | 3/2010 | Swan | G01G 23/42 |
| | | | 177/25.13 |
| 2011/0186356 A1* | 8/2011 | Sheikh | G01G 19/414 |
| | | | 177/25.13 |
| 2012/0233633 A1* | 9/2012 | Nishikawa | 725/12 |
| 2014/0129981 A1* | 5/2014 | Soderberg | 715/810 |
| 2014/0140560 A1* | 5/2014 | Melanson et al. | 381/365 |
| 2014/0213181 A1* | 7/2014 | Rosenberg | 455/41.1 |
| 2014/0223548 A1* | 8/2014 | Wassingbo | 726/19 |
| 2014/0270395 A1* | 9/2014 | Jones et al. | 382/110 |
| 2015/0055827 A1* | 2/2015 | Bailey | 382/103 |
| 2015/0058020 A1* | 2/2015 | Bailey | 704/275 |
| 2015/0068102 A1* | 3/2015 | Britz | 43/25 |

\* cited by examiner

*Primary Examiner* — Phi Hoang
(74) *Attorney, Agent, or Firm* — Myers Bigel & Sibley

(57) ABSTRACT

A handheld apparatus includes a weight sensor configured to weigh an object, a display configured to display the weight of the object, and a wireless transmitter configured to wirelessly transmit the object weight data from the weight sensor to one or more remote devices. The apparatus also includes a user interface that allows a user to control operation of the weight sensor, and to control transmission of object weight data to a remote device via the wireless transmitter. The user interface may also allow a user to enter and display descriptive information about an object that can be transmitted with the object weight data to a remote device. A second handheld apparatus is used to capture an image of the object and display object weight data within the image.

13 Claims, 18 Drawing Sheets

HANDHELD DEVICES AND METHODS FOR ACQUIRING OBJECT DATA

FIELD OF THE INVENTION

The present invention relates generally to measuring and, more particularly, to apparatus and systems for measuring data.

BACKGROUND OF THE INVENTION

Many fishing enthusiasts keep a personal log of their fishing activities, including time, date and location of a fishing activity, as well as information about any fish caught, including species, weight, length, etc. Portable devices that allow fishing enthusiasts to quickly weigh and measure fish are known. For example, U.S. Pat. No. 6,765,155 describes a portable device for weighing and measuring fish. U.S. Pat. No. 6,696,650 to Muller et al. describes an electronic fish scale with a digital output screen. Unfortunately, recording data from these portable devices into a written log can be inconvenient and/or cumbersome during an outing. Moreover, written logs may omit useful details or may include inaccurate information if written after an outing.

SUMMARY OF THE INVENTION

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a handheld apparatus includes a weight sensor configured to weigh an object, such as a fish, game, etc., a display configured to display the weight of the object, and a wireless transmitter configured to wirelessly transmit the object weight data from the weight sensor to one or more remote devices. The apparatus also includes a user interface that allows a user to control operation of the weight sensor, and to control transmission of object weight data to a remote device via the wireless transmitter. The user interface may also allow a user to enter and display descriptive information about an object that can be transmitted with the object weight data to a remote device.

In some embodiments, the user interface includes a trigger switch that is manually operable by a user and configured to control operations of the weight sensor, display, and wireless transmitter. In some embodiments, the user interface allows a user to control operation of the weight sensor and to control transmission of the object weight data to a remote device via voice commands.

In some embodiments, the apparatus includes a processor that is configured to process object weight data into a predetermined format prior to being transmitted to a remote device. The processor may also be configured to associate time and date information with object weight data such that the time and date information is transmitted with the object weight data to a remote device.

In some embodiments, the weight sensor includes a support member that extends outwardly from a housing of the handheld apparatus that configured to suspend an object therefrom for weighing. The support member may include a clamp having a pair of spaced-apart jaws for gripping an object.

In some embodiments, the apparatus includes one or more environmental sensors configured to detect and/or measure environmental conditions in a vicinity of the object. Exemplary environmental sensors include, but are not limited to, sensors configured to detect and/or measure one or more of the following types of environmental information: humidity, temperature, barometric pressure, ultraviolet radiation, ozone, carbon monoxide, carbon dioxide, airborne pollution, and wind. Such environmental condition information can be transmitted via the wireless transmitter to a remote device with various other object data, such as object weight data, time and date data, user input data, etc.

In some embodiments, the apparatus includes a location sensor (e.g., a GPS receiver, etc.) that is configured to detect a geographical location of the apparatus. Geographical location information can be transmitted via the wireless transmitter to a remote device with various other object data, such as object weight data, time and date data, user input data, etc.

In some embodiments, the apparatus includes a length sensor that is configured to measure the length of an object. The display is configured to display weight and length data of an object measured by the weight and length sensors. Object length data can be transmitted via the wireless transmitter to a remote device with various other object data, such as object weight data, time and date data, user input data, etc. The length sensor may utilize one or more optical emitters and one or more optical detectors to determine the length of an object. Alternatively, the length sensor may utilize one or more acoustical emitters and one or more acoustical detectors to determine the length of an object.

According to some embodiments of the present invention, a first handheld apparatus for weighing an object, such as fish, game, and the like, is utilized in combination with a second handheld apparatus, such as a mobile phone, smart phone, tablet computer, or personal digital assistant. The second handheld apparatus includes a camera and a display configured to display an image of an object taken by the camera along with object weight data received from the first handheld apparatus. The second handheld apparatus includes a software application that allows a user to edit images taken by the camera, and to enter, display, and edit descriptive information with an image of an object. The second handheld apparatus may include a software application that can interpolate a length of an object via an image of the object taken by the camera.

In some embodiments, the second handheld apparatus is configured to detect a geographical location when an image of the object is taken by the camera, for example, via a GPS receiver, etc. The second handheld apparatus may include a software application that displays a map with an icon on the map that is representative of the geographical location of the second handheld apparatus.

In some embodiments, the second handheld apparatus comprises a knowledge base containing information associated with an object and a software application for searching and retrieving information from the knowledge base. Alternatively, the second handheld apparatus is configured to access information about an object from one or more remotely located reference sources. For example, if an object is a fish, a knowledge base contained within the second handheld apparatus, or accessible by the second handheld apparatus, may include fishing regulation information, bait information, fishing knot information, fishing line size information, fish location information, fish species information, fishing lure information, fish recipes, and/or lunar cycle information for specific geographical locations, etc.

In some embodiments, the first handheld apparatus is configured to transmit a prompt to a user of the second handheld apparatus to take a picture of the object via the second handheld apparatus camera substantially simultaneously with, or subsequently to, the transmission of object weight data to the second handheld apparatus.

In some embodiments, the second handheld apparatus has a software application that allows the first handheld apparatus to remotely operate the camera of the second handheld apparatus. For example, a user can place the second handheld apparatus on a surface (or support it on a tripod or other device) and remotely operate the camera thereof by the first handheld device via signals transmitted to the software application.

In some embodiments, the first handheld apparatus is configured to identify a third handheld apparatus within a predetermined proximity, prompt the user of the presence of the third handheld apparatus, and wirelessly transmit object weight data to the third handheld apparatus in response to user authorization.

In some embodiments, the first handheld apparatus is configured to receive and store images taken by the camera of the second handheld apparatus.

In some embodiments, the second handheld apparatus has a software application that is configured to receive and display advertising from one or more remote sources for goods and/or services related to an object. For example, the second handheld apparatus may be configured to receive and display advertising for goods and/or services related to an object and that are offered for sale within a predetermined distance of a geographical location of the second handheld device.

According to other embodiments of the present invention, a method of acquiring and displaying object data includes weighing an object via a first handheld apparatus, transmitting object weight data from the first handheld apparatus to a second handheld apparatus, acquiring an image of the object via a camera of the second handheld apparatus, and displaying the image of the object with the weight data via a display of the second handheld apparatus. Additional data may be obtained via the second handheld apparatus and displayed with the image. Exemplary information may include, but is not limited to, geographical location information, environmental condition information, object identification information, and/or object length information. In some embodiments, the object image and data may be shared with a third handheld device.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate some exemplary embodiments. The drawings and description together serve to fully explain the exemplary embodiments.

DETAILED DESCRIPTION OF THE INVENTION

Figure 1C:
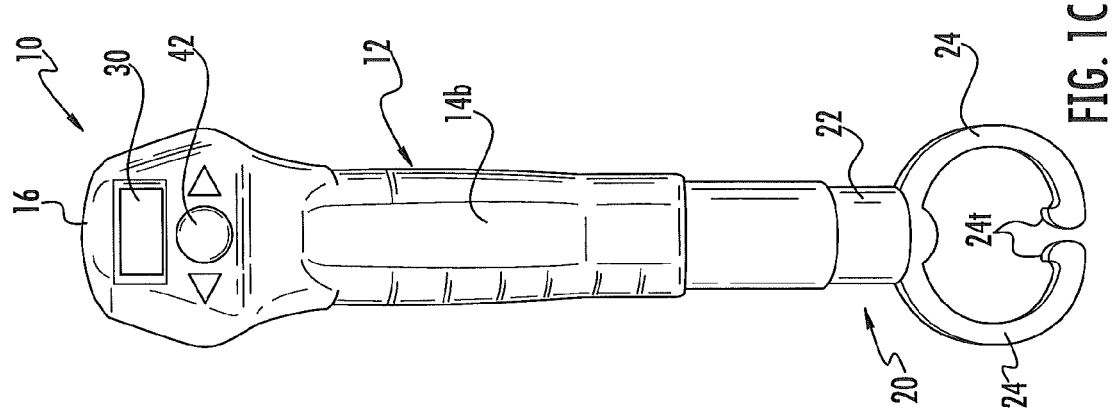
FIGS. 1A-1C are perspective views of a handheld measuring apparatus, according to some embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

As used herein, the term "and/or" includes any and all combinations of one or more of the associated listed items and may be abbreviated as "/".

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terms "image" and "photograph", as used herein, are interchangeable and refer to an image captured by a camera of a device, such as a mobile phone, smart phone, a tablet computer, a personal digital assistant, etc.

The term "about", as used herein with respect to a value or number, means that the value or number can vary by +/−20%, 10%, 5%, 1%, 0.5%, or even 0.1%.

Figure 1B:
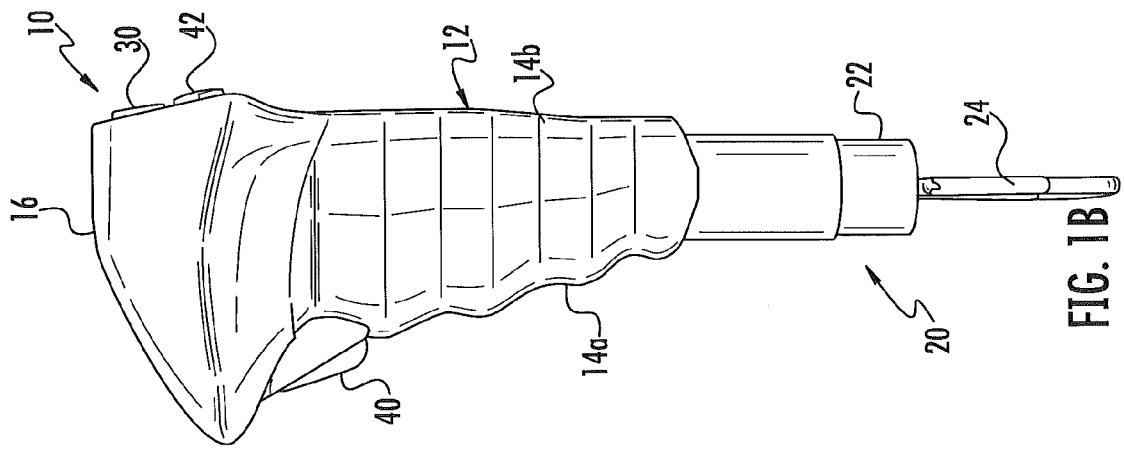
Figure 1A:
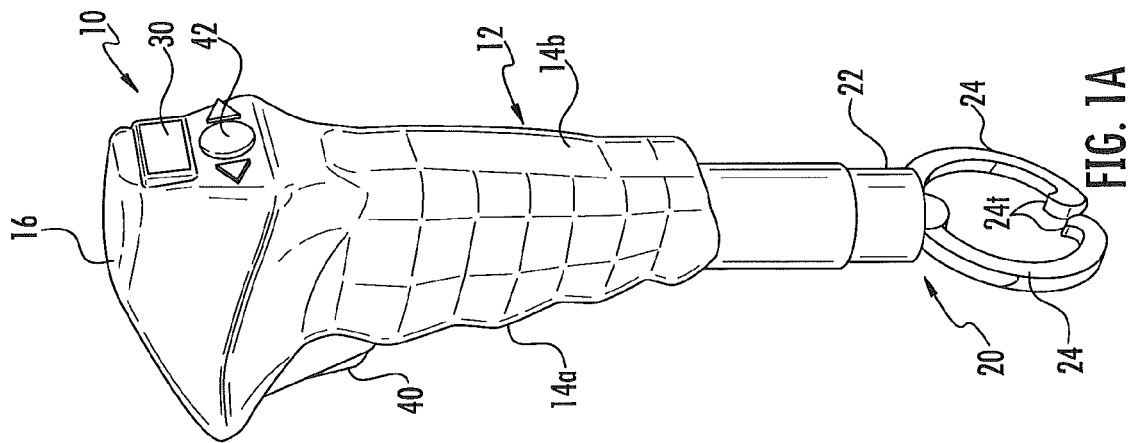
Figure 2:
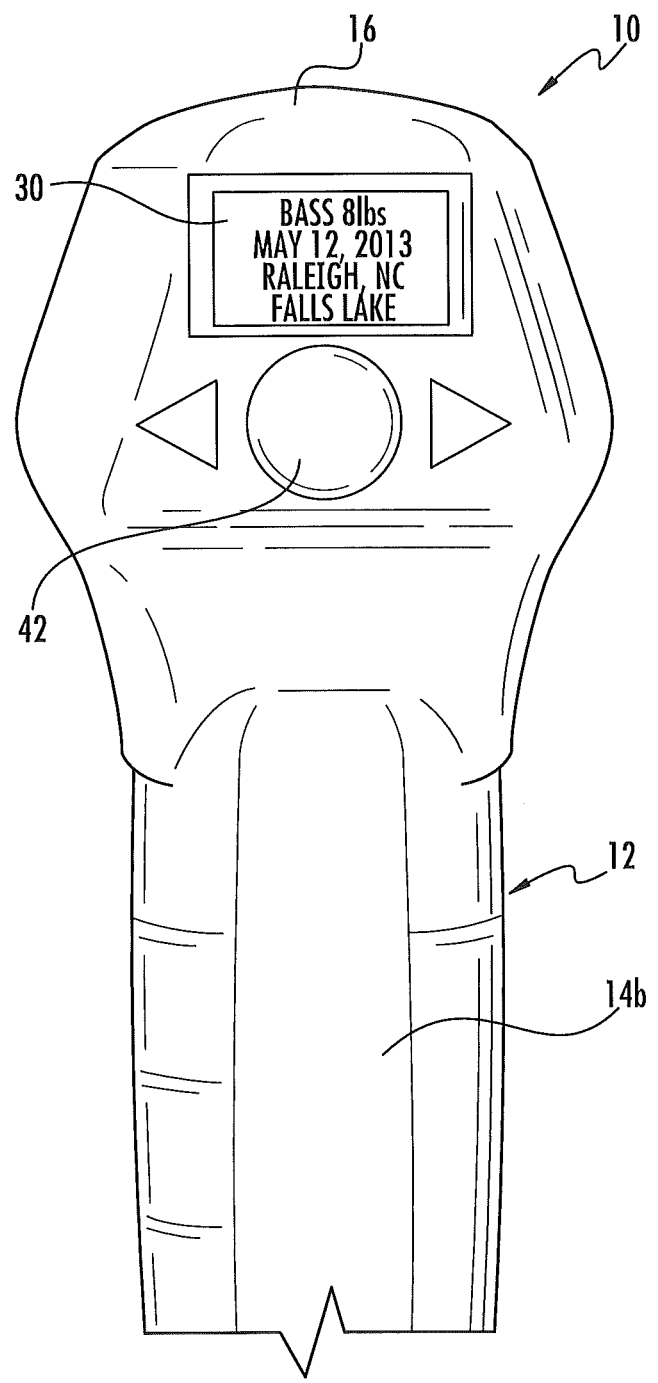
FIG. 2 is a perspective view of the handheld measuring apparatus of FIGS. 1A-1C illustrating various data displayed within the display.

Referring now to FIGS. 1A-1C, a handheld apparatus 10 for weighing objects, according to some embodiments of the present invention, is illustrated. The illustrated apparatus 10 is designed for use by sportsmen, such as fishermen, and includes a housing 12, a weight sensor 20 disposed within the housing 12 that is configured to weigh objects, such as fish, game, etc., and a display 30. The housing 12 has a handle portion 14 with opposite front and rear portions 14a, 14b and a display portion 16, as illustrated. The handle portion 14 has an ergonomic shape that is conducive to gripping by a user. In some embodiments, the handle portion 14 may include tactile material (e.g., rubber, silicone, foam plastic, etc.) at one or more locations that helps a user grip the housing 12 and that resists slipping, particularly when the apparatus 10 is wet.

In the illustrated embodiment, a trigger switch or control 40 is located on the front portion 14a of the handle portion 14, and a pair of user control buttons 42 are located on the rear portion 14b of the handle portion 14. In operation, a user grips the handle portion 14 such that the display 30 is viewable, such that the trigger control 40 can be operated by an index finger, and such that the user control buttons 42 can be operated via the user's thumb. Embodiments of the present invention, however, are not limited to the illustrated trigger control 40 and control buttons 42. Various numbers and types of buttons/controls may be utilized, without limitation.

In combination with the display 30, the trigger control 40, and control buttons 42 serve as a user interface that allows a user to control operation of the weight sensor 20, and to control transmission of object weight data to at least one remote device (80, FIG. 4) via a wireless transmitter (314, FIG. 16), such as a Bluetooth® transmitter. In addition, the trigger control 40 and control buttons 42 allow a user to enter and display descriptive information within the display 30.

The illustrated display portion 16 is enlarged relative to the handle portion 14 and has an angled configuration such that the display 30 is visible by a user gripping the handle portion 14. The display 30 is visible through the housing 12 and is configured to display the weight of an object suspended from the weight sensor support member 22. The display 30 is also configured to display other information obtained from other sources and/or input by a user, as will be described below.

The display 30 can be one of any assortment of displays known to those skilled in the art. For example, liquid crystal displays (LCDs) may be utilized because of their low power draw (for example, LCDs utilized in digital watches and portable computers are appropriate for use with the invention). Other suitable displays can include an array of light emitting diodes (LEDs) arranged to display numbers. In some embodiments of the present invention, the display 30 may be a touch screen display. In some embodiments, a touch screen display may replace the trigger control 40 and/or control buttons 42 because user operations can be made via the touch screen.

In some embodiments of the present invention, user voice controls may be utilized to control operation of the weight sensor 20, display 30, and transmitter 314.

Embodiments of the present invention are not limited to the illustrated shape and configuration of the housing 12. The handle portion 14 and display portion 16 may have various shapes and configurations. In addition, the housing 12 may be formed from various types of materials including various types of polymeric materials. According to some embodiments of the present invention, the housing 12 is substantially waterproof or water resistant and prevents the ingress of water and moisture therein. According to some embodiments of the present invention, the housing 12 is configured to be buoyant such that the apparatus 10 floats if dropped into water. Alternatively, buoyant material may be attached to (or disposed within) the housing 12 that causes the apparatus 10 to float in water. In some embodiments, the housing 12 may include a strap loop (not shown). A user may insert a strap, lanyard or other device through such a strap loop to facilitate carrying/securing the apparatus 10.

The weight sensor 20 may be virtually any type of device configured to weigh an object and generate an electronic signal such as, for example, a strain gauge, a load cell, or a scale that utilizes the linear displacement of a spring along a variable resister. Weight sensors are well understood by those skilled in the art of the present invention, and need not be described further herein. For example, exemplary scales are described in U.S. Pat. Nos. 5,031,710 and 6,696,650. Embodiments of the present invention are not limited to a particular type of weight sensor.

In some embodiments, the weight sensor 20 allows a user to weigh a group of objects, and calculate a total weight of all objects in a group, along with individual weights for each object. For example, a user can weigh ten fish and the weight sensor 20 can keep track of each individual fish weight in addition to a total weight value for the ten fish.

The illustrated weight sensor 20 includes a support member 22 that extends outwardly from the internal portion of the weight sensor 20 (e.g., from a linear displacement spring) within the housing 12. The illustrated support member 22 includes a clamp 22 having a pair of spaced-apart jaws 24, each having a respective gripping tooth 24t for clampingly engaging an object such that the object can be suspended and weighed via the weight sensor 20. The illustrated jaws 24 are particularly adapted to engage the lower lip of a fish such that the fish can be suspended and weighed via the weight sensor 20. In some embodiments, the jaws 24 may be movably secured to the support member 22 and a biasing element (not shown), such as a spring, may be configured to urge the jaws 24 to a clamping position. In some embodiments, an actuator (not shown) may be provided that allows a user to pivot the jaws 24 between an open position and a closed, gripping position.

A processor (300, FIG. 16) and wireless transmitter (314, FIG. 16) are disposed within the housing 12. The processor 300 receives input from the trigger control 40 and control buttons 42 and is configured to control operations of the weight sensor 20 and display 30. The wireless transmitter 314 is configured to wirelessly transmit object weight data from the weight sensor 20 to one or more remote devices (80, FIG. 4). Exemplary remote devices 80 include, but are not limited to, mobile cellular phones, smart phones, tablet computers, personal digital assistants, etc. In some embodiments, the processor 300 is configured to process weight data for an object into a predetermined format prior to being transmitted to a remote device. In some embodiments, the processor 300 is configured to associate time and date information with object weight data, and the wireless transmitter 314 is configured to wirelessly transmit the time and date information with the object weight data to one or more remote devices 80.

In some embodiments, the processor 300 allows user input of additional data to be transmitted with weight data. For example, when the object weighed by the handheld apparatus 10 is a fish, a user may be able to enter color information, size information, species information via the display 30 and transmit that information to a remote device 80 with weight data for the fish. Similarly, a user can enter various types of information about any object weighed via the apparatus 10.

The wireless transmitter 314 may be a Bluetooth® transmitter. The wireless transmitter 314 may transmit data using radio frequency (RF) waves, or it may transmit data on the infrared (IR) wavelength. In some embodiments, a combination of Bluetooth®, Wi-Fi, and/or cellular communications technologies may be used to transmit data to a remote device 80. In some embodiments, the wireless transmitter 314 may transfer data to a remote device 80 automatically when within a certain proximity to the remote device 80, such as via near field communications (NFC) technology. Various data transfer technologies may be utilized in accordance with embodiments of the present invention without limitation.

The handheld apparatus 10 is also configured to transmit software and software updates to a remote device 80 that allows the remote device 80 to implement various embodiments of the present invention. This may occur, for example, when a user uses the apparatus 10 for the first time.

The processor 300 may also be configured to obtain other information including, but not limited to, location information (e.g., GPS coordinates, etc.), and environmental condition information in the vicinity of the apparatus 10 (e.g., temperature, humidity, barometric pressure, etc,). For example, in some embodiments of the present invention, the apparatus 10 may include a GPS receiver (316, FIG. 16) and/or environmental sensor(s) (318, FIG. 16) configured to detect and/or measure environmental conditions in a vicinity of the apparatus 10. The environmental sensor(s) 318 may be configured to detect and/or measure the following types of environmental information: humidity, temperature, barometric pressure, ultraviolet radiation, ozone, carbon monoxide, carbon dioxide, airborne pollution, and/or wind. The processor 300 obtains GPS coordinates from the GPS receiver 316 and obtains various environmental information from the one or more environmental sensors 318. This additional information may be transmitted with object weight data to one or more remote devices.

According to some embodiments of the present invention, the handheld apparatus 10 may include stored information (and/or may be capable of accessing remotely stored information) for a variety of topics such as, but not limited to, bait information, descriptions of fish, locations of fish by region, body of water (e.g., fresh or salt water), location and season, fishing tips and tactics, etc. According to some embodiments of the present invention, the apparatus 10 can allow a user to easily determine game fish and bait fish types based on location and season, etc. For example, a user can search for information by either location or game fish desired. When a desired fish is selected it will be displayed within the display along with a list possible bait options for either artificial or live bait. After a user selects a bait type, the apparatus 10 will display an image of the bait for that date and time.

A power source (not shown) is provided within the apparatus 10 that provides power to the weight sensor 20, display 30, processor 300, and transmitter 312 (and other components of apparatus 10), as would be understood by one skilled in the art of the present invention. For example, one or more batteries may be disposed within housing 12 and configured to provide power to the weight sensor 20, display 30, processor 300, transmitter 314, and other components of apparatus 10. Other types of power sources may be utilized without limitation. For example, according to some embodiments of the present invention, the apparatus 10 may receive power, or some portion of power, from one or more photovoltaic cells ("solar cells") that convert radiant energy of sunlight directly into electrical energy.

Figure 16:
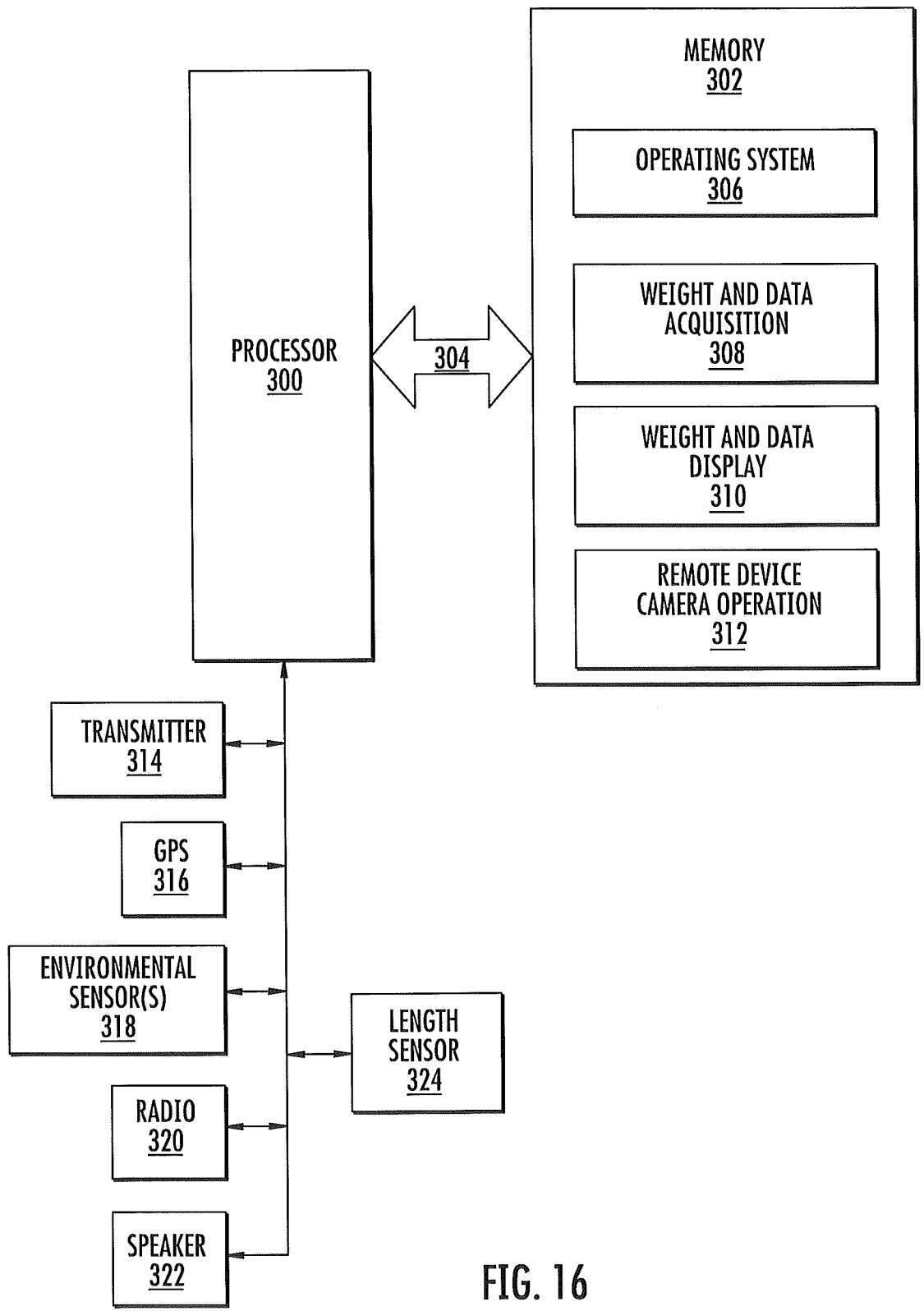
FIG. 16 illustrates an exemplary processor and memory that may be utilized by the apparatus of FIGS. 1A-1C in implementing various embodiments of the present invention.

In some embodiments of the present invention, the apparatus 10 includes a radio (320, FIG. 16), such as an AM/FM radio, shortwave radio, etc., and a speaker (322, FIG. 16). In some embodiments, the radio 320 may be tuned directly to a particular source, such as a source of weather information, for example.

In some embodiments of the present invention, the apparatus 10 includes a length sensor (324, FIG. 16) that is configured to measure the length of an object. For example, the length sensor may include one or more optical emitters and detectors. For example, when the object is a fish, the one or more optical emitters are configured to emit light beams toward the ground while the user lowers a fish suspended from the support member 22 and touches the tail of the fish on the ground. The optical detectors receive reflected light beams from the fish and the ground and are able to determine the distance that the beams have traveled. The processor 300 is then configured to interpolate how far the support member 22 is from the ground and, thereby, determine the length of the fish. If the support member 22 is twelve inches away from the ground in the last reading, as the fish tail touches the ground, then the fish is known to be twelve inches long. So, if no fish is attached to the weight sensor support member 22, and the apparatus 10 is lowered to ground, the display 30 will show zero inches as the clamp 22 touches the ground.

Similarly, the length sensor 324 may include one or more acoustic emitters and detectors. The one or more acoustic emitters are configured to emit sound waves toward the ground while the user lowers a fish suspended from the support member 22 and touches the tail of the fish on the ground. The acoustic detectors receive reflected sound waves from the fish and the ground and are able to determine the distance that the beams have traveled. The processor 300 is then configured to interpolate how far the support member 22 is from the ground and, thereby, determine the length of the fish.

Figure 4:
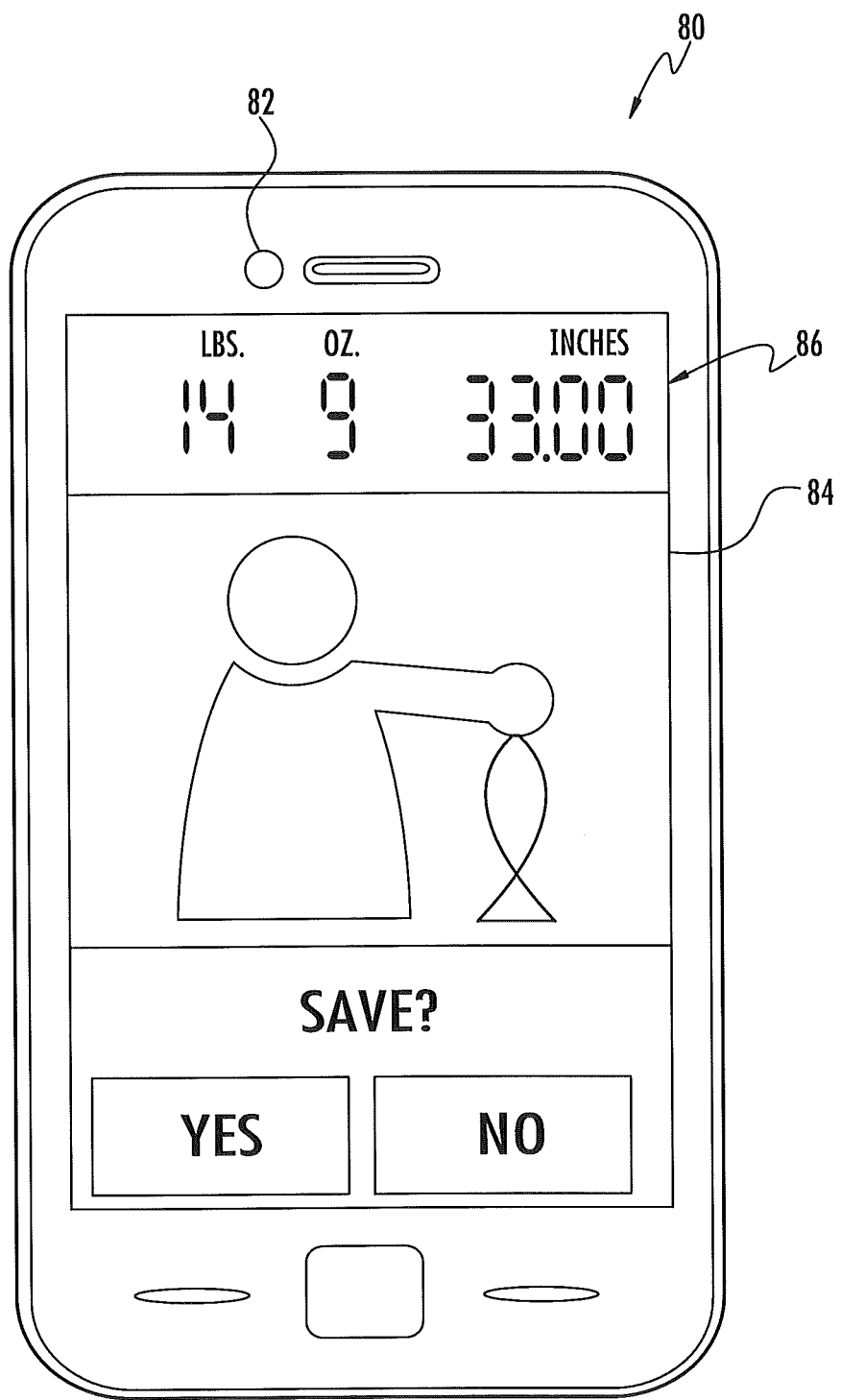
FIG. 4 illustrates an exemplary remote device that receives object data from the apparatus of FIGS. 1A-1C, according to some embodiments of the present invention.

The display 30 is configured to display weight and length data of an object as measured by the weight sensor 20 and the length sensor 324. The wireless transmitter is configured to wirelessly transmit object weight and length data to a remote device 80 (FIG. 4).

The handheld apparatus 10 is configured to wirelessly transmit object weight data, and other data as described above, to a remote device 80 (FIG. 4), such as a mobile cellular phone, smart phone, a tablet computer, or a personal digital assistant. As illustrated in FIG. 4, the remote device 80 includes a camera 82 and a display 84 configured to display an image of an object taken by the camera 82 with object weight data (and/or length data) 86 received from the handheld apparatus 10.

Figure 3:
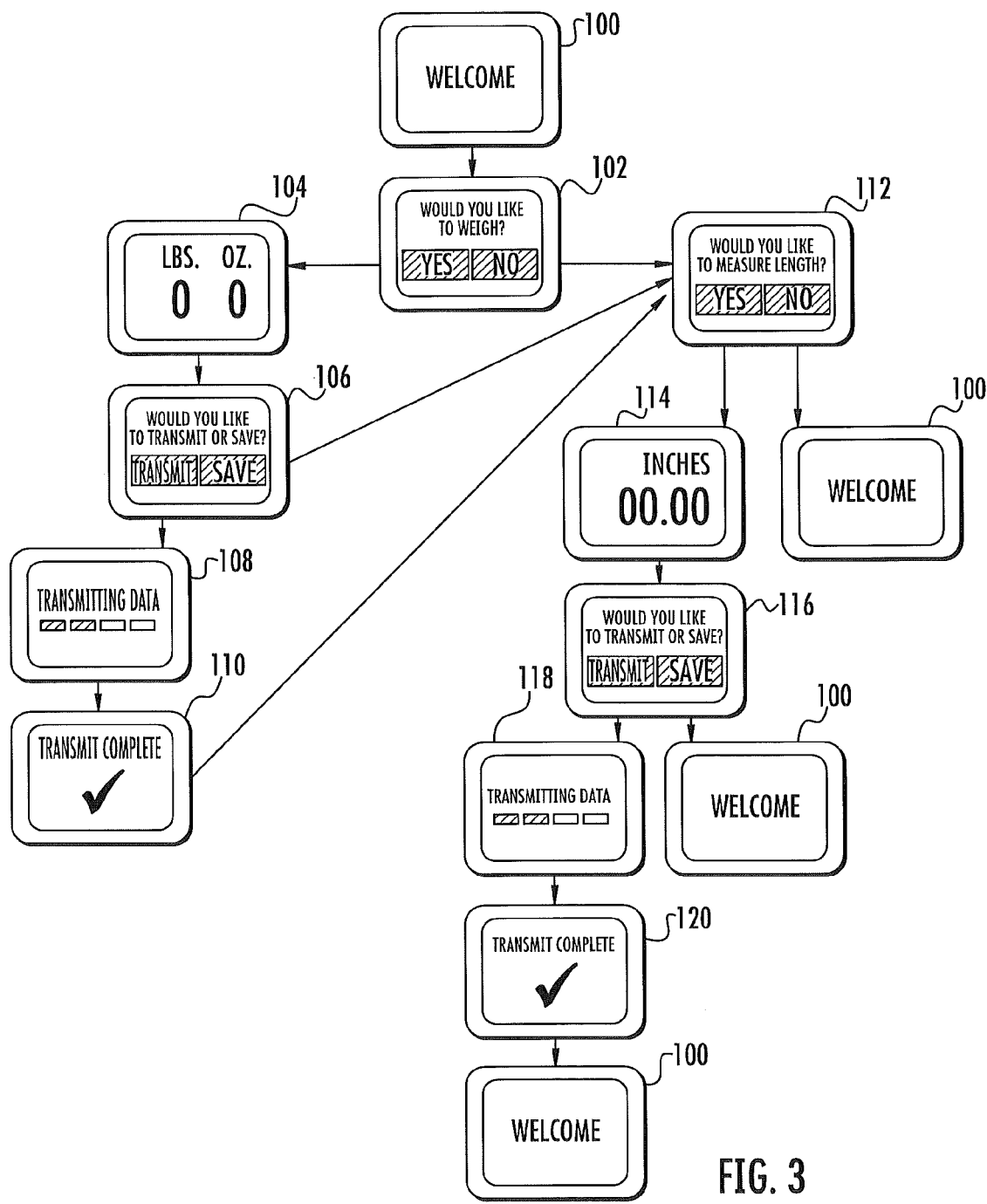
FIG. 3 illustrates a sequence of user interfaces that represent various operations performed by the apparatus of FIGS. 1A-1C, according to some embodiments of the present invention.

FIG. 3 illustrates a sequence of user interfaces that represent various operations that are performed by the handheld apparatus 10 of FIGS. 1A-1C and 2. All of the operations illustrated in the various user interfaces may be controlled by a user via the illustrated user controls 40, 42. User interface 100 is a "home screen" that is displayed in the display 30 of apparatus 10 when the apparatus 10 is powered up. If an object, such as a fish, is suspended from the weight sensor 20, user interface 102 is displayed that asks the user if he/she wants to weigh the object. If the answer is yes, user interface 104 is displayed that displays the weight of the object as measured by the weight sensor 20. Next, user interface 106 is displayed that asks the user if he/she wants to transmit the weight data to a remote device and/or save the weight data. If the user chooses to transmit the weight data to a remote device, user interface 108 is displayed followed by user interface 110 indicating that transmission is complete.

In some embodiments of the present invention, the apparatus 10 includes a length sensor, as described above. In such embodiments, the apparatus 10 displays user interface 112 that asks the user if he/she wants to measure the length of an object, such as an object suspended from the weight sensor 20. If the user chooses not to measure the length of the object, the home screen 100 is displayed. If the answer is yes, user interface 114 is displayed that displays the length of the object as measured by the length sensor. Next, user interface 116 is displayed that asks the user if he/she wants to transmit the length data to a remote device and/or save the length data. If the user chooses to transmit the length data to a remote device, user interface 118 is displayed followed by user interface 120 indicating that transmission is complete. The home screen 100 is displayed when operations are complete.

Figure 5:
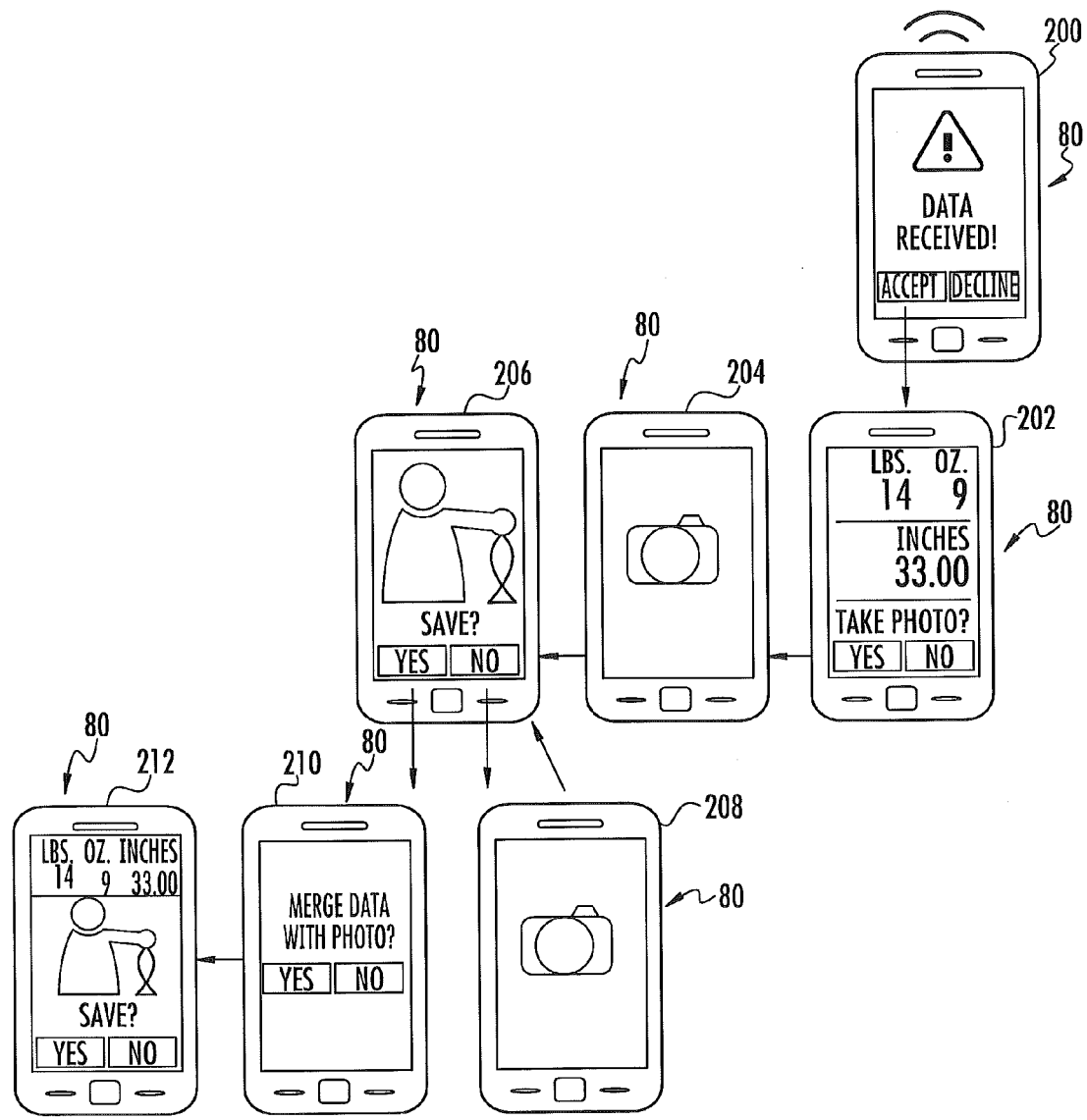
FIG. 5 illustrates a sequence of user interfaces that represent various operations performed by the remote device of FIG. 4, according to some embodiments of the present invention.

FIG. 5 illustrates a sequence of user interfaces that represent various operations of a remote device 80 (FIG. 4) when data is received from the handheld apparatus 10. User interface 200 notifies a user that data has been received from handheld apparatus 10, and the user is given the option to accept or decline the data. In user interface 202, the user has accepted the data and the data is displayed. In the illustrated example, the data is weight and length of an object, such as a fish. User interface 202 also gives the user the option to take a photograph of the object. User interface 204 represents the camera function of the remote device 80 and user interface 206 displays the photograph of the object taken by the camera of the remote device 80. User interface 206 also gives the user the option to save the photograph. If the user chooses not to save the photograph, the remote device returns to the camera function so that another photograph of the object can be taken, as represented by user interface 208. If the user decides to save the photograph, user interface 210 is displayed that asks the user if he/she wants to merge the received data (e.g., weight, length, time and date, user input, etc.) with the photograph. If the answer is yes, the received data is displayed with the photograph as represented in user interface 212.

Figure 6:
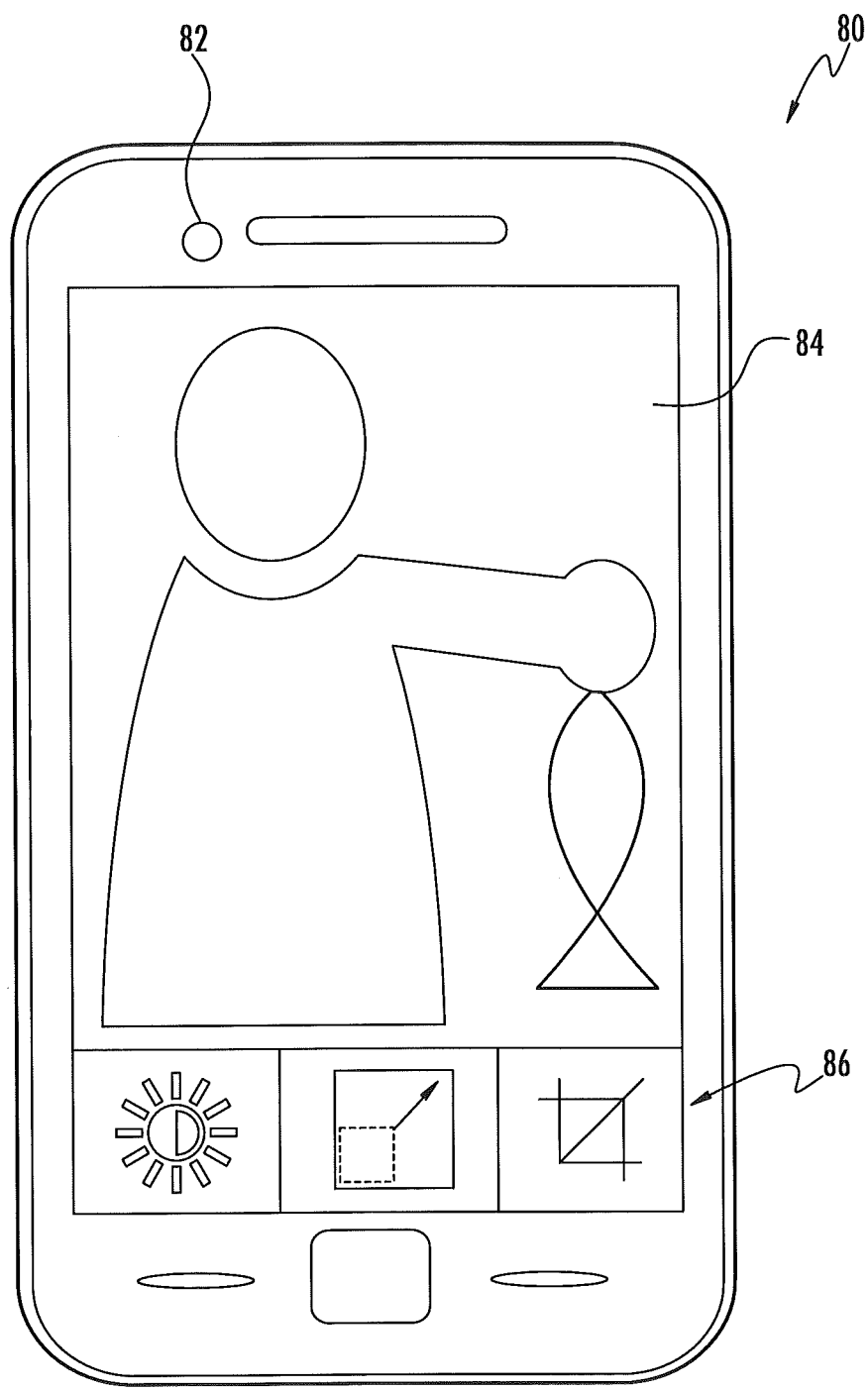
FIG. 6 illustrates an image displayed within the remote device of FIG. 4 and with various image editing tools displayed for editing the image, according to some embodiments of the present invention.

The remote device 80 may include an image editor and/or may receive an image editing software application from the apparatus 10. FIG. 6 illustrates a remote device 80 displaying an image within the user interface 84. Image editing tools 86 are displayed at the bottom of the user interface 84. Exemplary image editing functions may include, but are not limited to, image shading, image lighting, image cropping, etc. In addition, the image editor of the remote device 80 may allow a user to enter and display descriptive information with an image of the object.

The remote device 80 may include a software application that allows the device 80 to interpolate a length of an object via an image of the object taken by the camera of the remote device 80. For example, when the handheld apparatus 10 is holding a fish and a photograph is taken of the fish by the remote device 80, a software application running on remote device 80 may determine the length of the fish by comparing the fish length to the known length of the handheld apparatus 10, or to another reference object in the field of view of a known length.

In some embodiments of the present invention, the handheld apparatus 10 is configured to transmit a prompt to a user of the remote device 80 to take a picture of the object via the camera of the remote device 80 substantially simultaneously with, or subsequently to, the transmission of the object weight data to the remote device 80. Moreover, in some embodiments of the present invention, the handheld apparatus 10 is configured to operate the camera of the remote device 80. In other words, the user can use the handheld apparatus 10 as a remote control for operating the camera of the remote device 80. A software application on the remote device 80 allows a user to control the camera of the remote device 80 via user commands transmitted by the wireless transmitter 314 of the handheld apparatus 10.

In some embodiments of the present invention, the handheld apparatus 10 is configured to identify other remote devices 80 within a predetermined proximity of the handheld apparatus 10, prompt the user of the handheld apparatus 10 of the presence of any other remote device 80, and then wirelessly transmit object weight data (as well as other data) to one or more identified remote devices 80 in response to user authorization.

In some embodiments, the handheld apparatus 10 is configured to receive and store images from a remote device 80.

Figure 7:
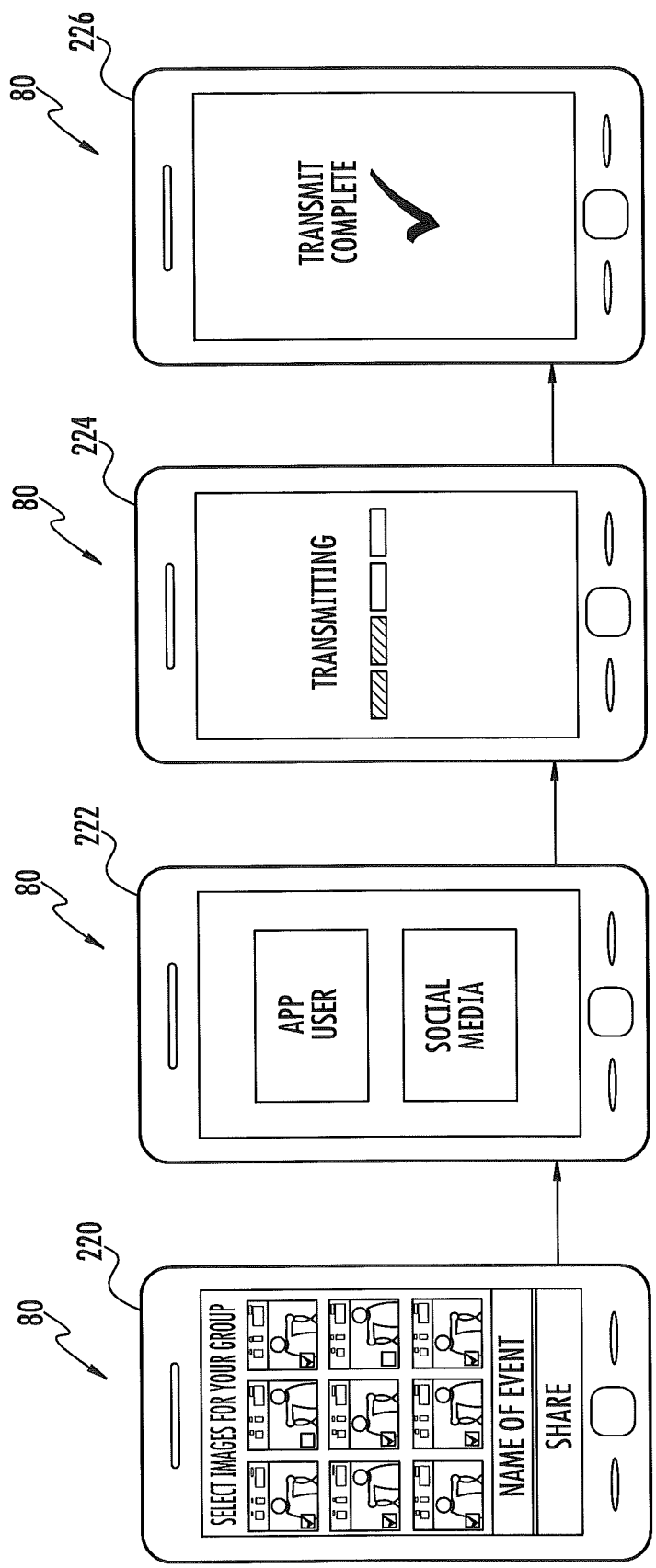
FIG. 7 illustrates a sequence of user interfaces that represent various operations performed by the remote device of FIG. 4, according to some embodiments of the present invention.

Embodiments of the present invention allow users to utilize social media (e.g., Facebook, Twitter, and other websites/applications used for social networking) with respect to photographs of objects taken by the camera of a remote device 80. For example, as illustrated in FIG. 7, a user having one or more photographs of one or more objects, represented by user interface 220, can choose to share these photographs with others via social media, represented by user interfaces 222, 224, and 226.

Figure 8:
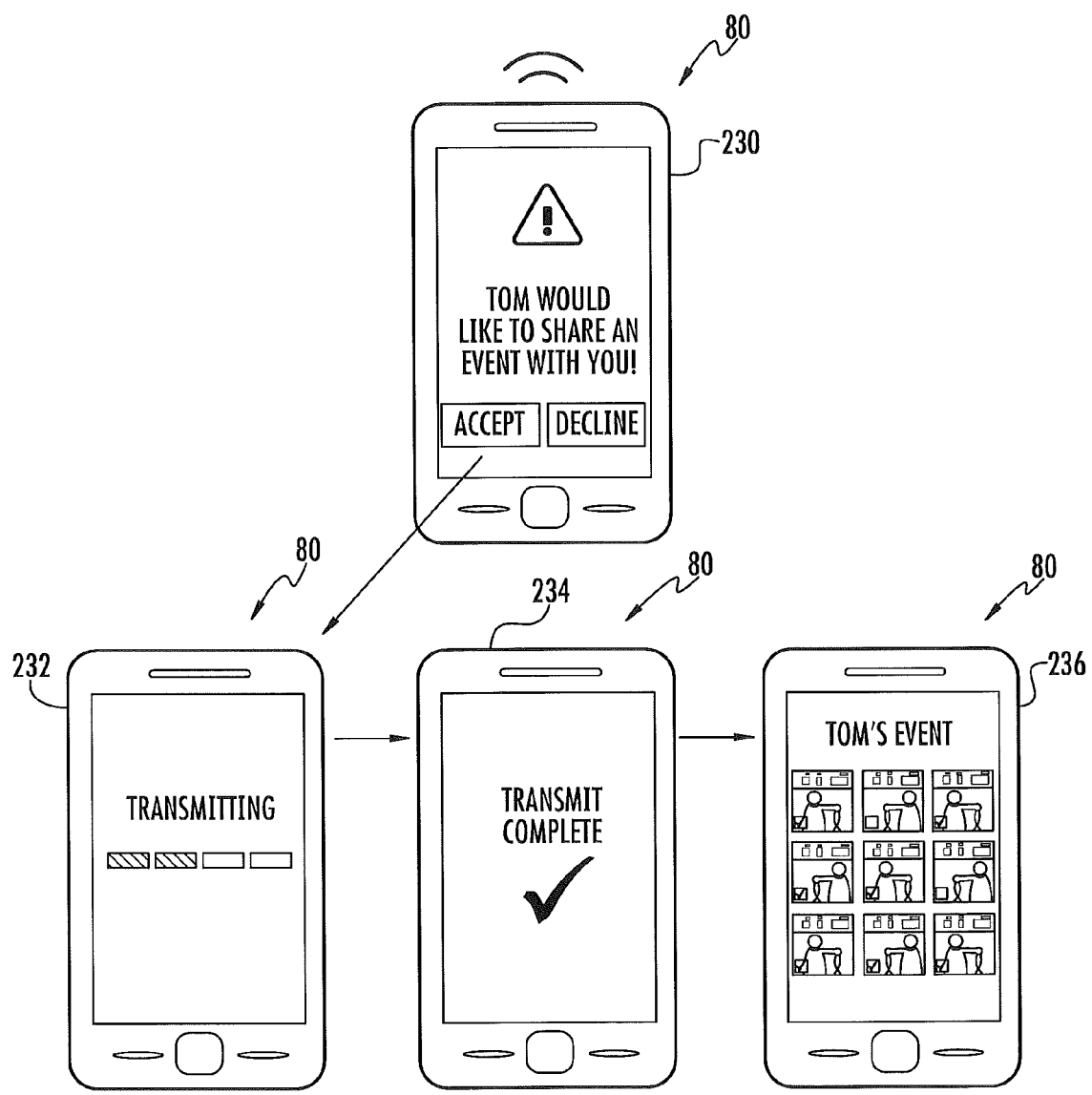
FIG. 8 illustrates a sequence of user interfaces that represent various operations performed by the remote device of FIG. 4, according to some embodiments of the present invention.

FIG. 8 illustrates a user sharing an event with others via user interfaces 230, 232, 234 and 236. In user interface 230, a user has sent an invitation to another user to participate in an event. User interfaces 232, 234 illustrate the acceptance of an event by another user and user interface 236 illustrates the sharing user's event displayed on the accepting user's device 80. For example, a user can create a custom event or use a stock event and share that event with chosen users. An event is a timed tournament or contest that may be a treasure hunt for fish types where users set forth a group of fish species that must be caught to complete the contest or event. The user that is the first participant in the event that catches all required species and places his own image in the placeholder slots wins the tournament. The placeholder slot images might be a line drawing of a certain species or a ghosted image of the species, then the user will place his own image of the required species into the required slot replacing the ghosted image. An example might be a stock salt water fishing event. This event might require participants to catch a flounder, Spanish mackerel, king mackerel, blue fish, or spot fish. As the user catches each type of required fish he will post his image on his contest board. Participants can view the progress of all other participants in real time to know how they compare to other users. The winner of the event would be the first participant to replace all the species with their own fish image.

An event may also be a contest or tournament that is stock or user created where certain parameters are pre-set and the participants compete to finish the requirements the fastest or in a certain order. The parameters might be something like a "BASS, 12 inches, and 5 lbs or greater, 5 day period." Users then attempt to catch and create a photograph of the fish that meets the criteria that was set forth. The user who catches and photographs the images first which meets the parameters of the event will be the winner.

Users may create and submit events to other users. Users may create prizes (a special title the user carries within the app or a certificate that user can print) that are a custom or stock placard or trophy document. The document may resemble an official fishing citation or a certificate of completion, but for entertainment purposes only.

Figure 9:
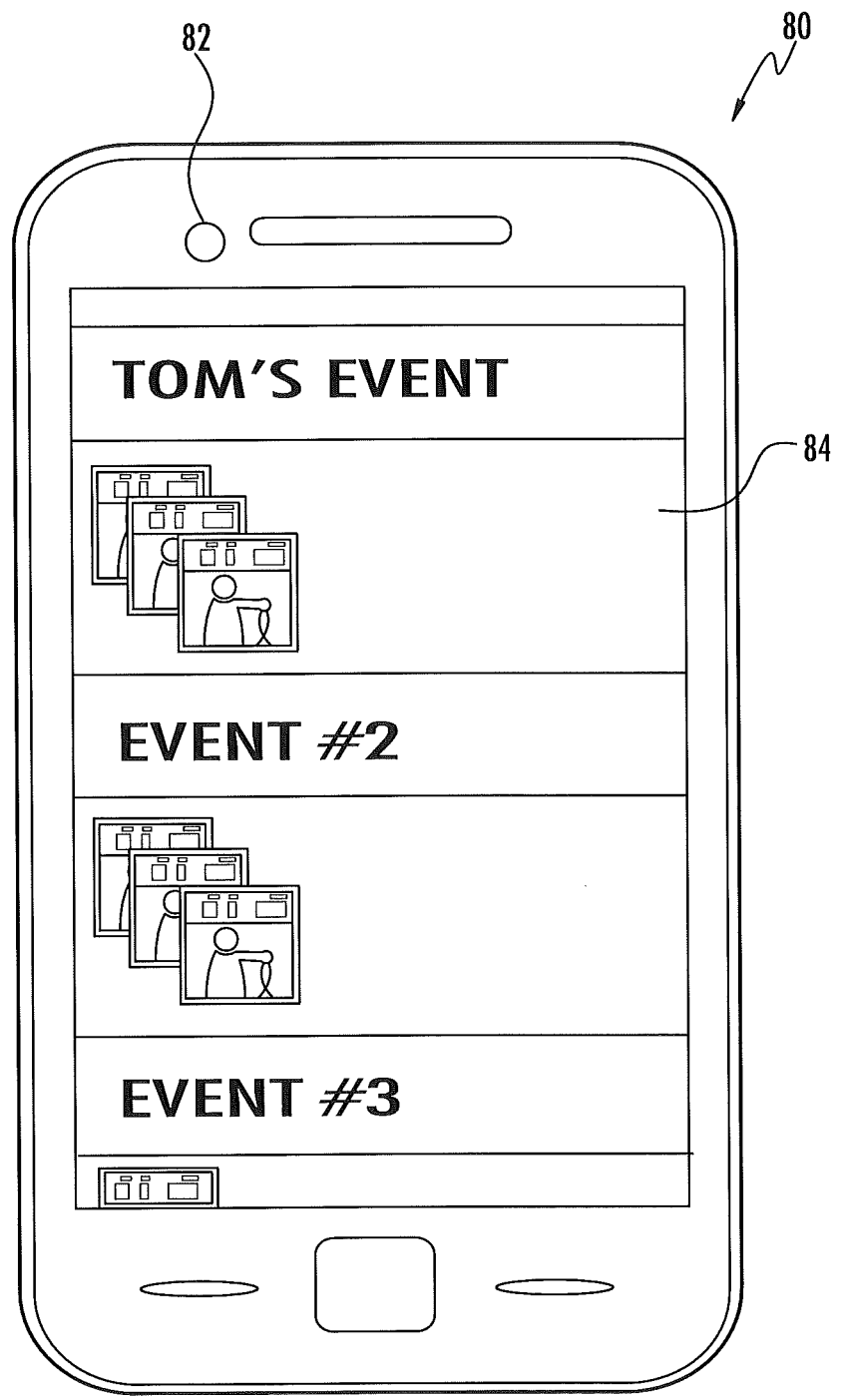
FIGS. 9-15 are exemplary user interfaces that represent various operations performed by the remote device of FIG. 4, according to some embodiments of the present invention.

FIG. 9 illustrates various events displayed within a remote device 80 in accordance with embodiments of the present invention. In the illustrated display 84 of device 80, a user can view multiple ongoing events in a simple graphical summary or list form. The user can quickly see which events are live that he is a participant of, and some at a glance specifications or information about the underlying event. The user can click on any entry and get a full view of the event. In some embodiments, the list might include a thumbnail image related to event. In some embodiments, a list of event parameters of a respective event or critical data such as times and dates or title of event may be displayed. This feature allows users to keep track of multiple ongoing events in a simple graphic format or page.

Figure 10:
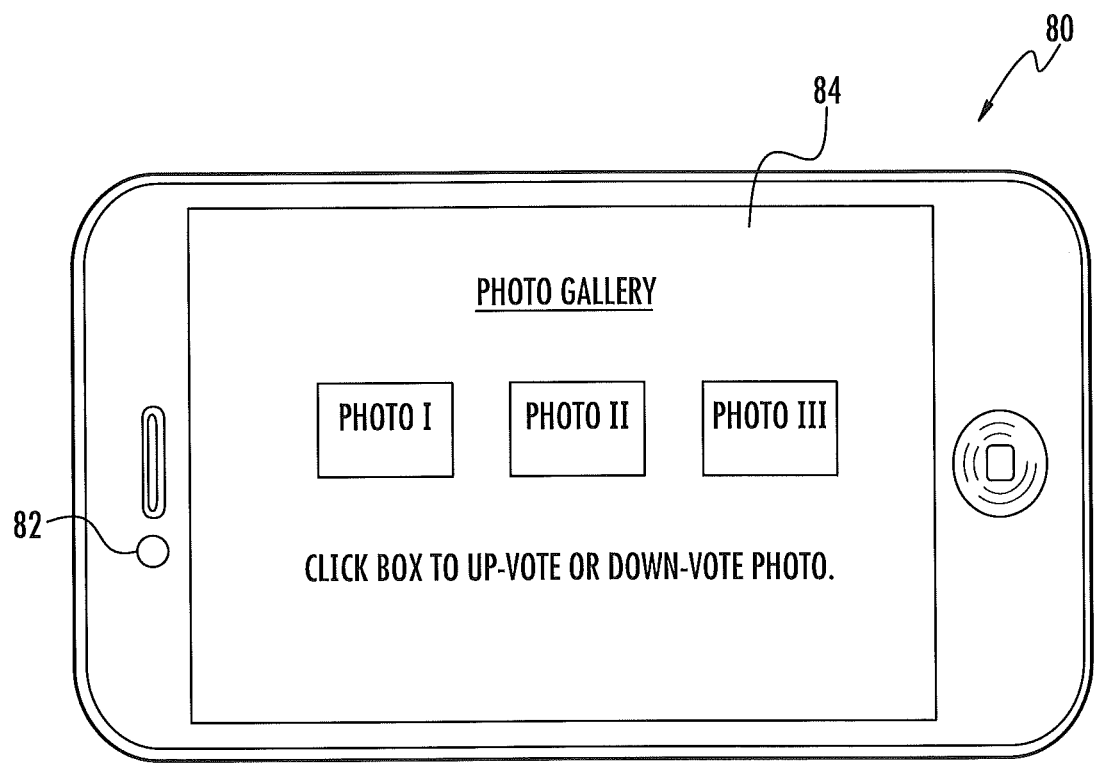

FIG. 10 illustrates the remote device 80 connected to an online user group and where the top photographs are posted and arranged in a gallery based on voting by other users. This photo gallery display may be located on a website, a Facebook® page, or locally on the remote device 80. Various timed or un-timed events can be created where users will be asked to submit pictures of their fish (or other wildlife) for certain categories of species or other parameters such as length or weight or rarity of a fish or more general specifications such as images of children's biggest catch. Participants are able to vote for or against each submitted image. Each user is allowed one vote per image. The image with the highest vote count at the end of the event is the winner. These events and contests can be done for marketing purposes, to create general excitement among users and participants, and/or to grow user bases and increase popularity of the underlying software application or device. For instance for certain events, there may be a corporate sponsor who sells fishing lures, where the winner of their event may be giving prizes including the sponsors products or lures. The events and respective trophy gallery may be official or private event, it may be local, regional or national in scope.

Figure 11:
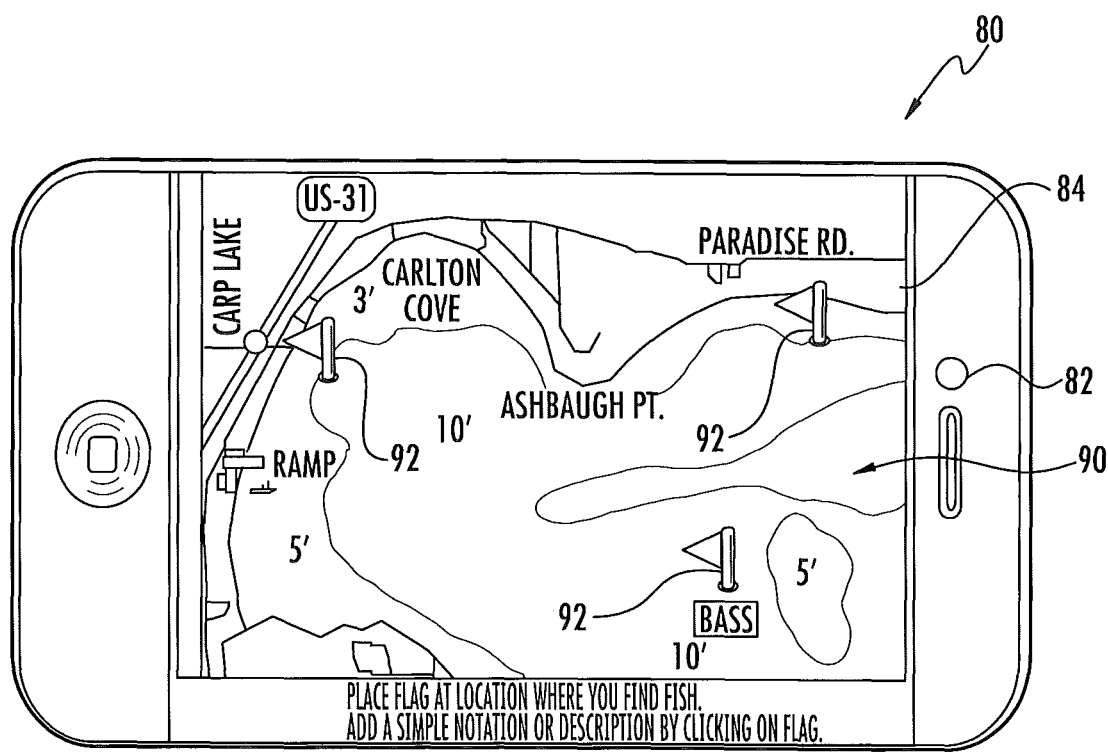

Referring to FIG. 11, the remote device 80 may be configured to detect a geographical location of the remote device 80 (e.g., via a GPS receiver) when an image of an object is taken by the camera 82 of the remote device 80. The remote device 80 is then configured to display a map 90 within the remote device display 84 and to also display an icon 92 on the map 90 representative of the geographical location.

Figure 12:
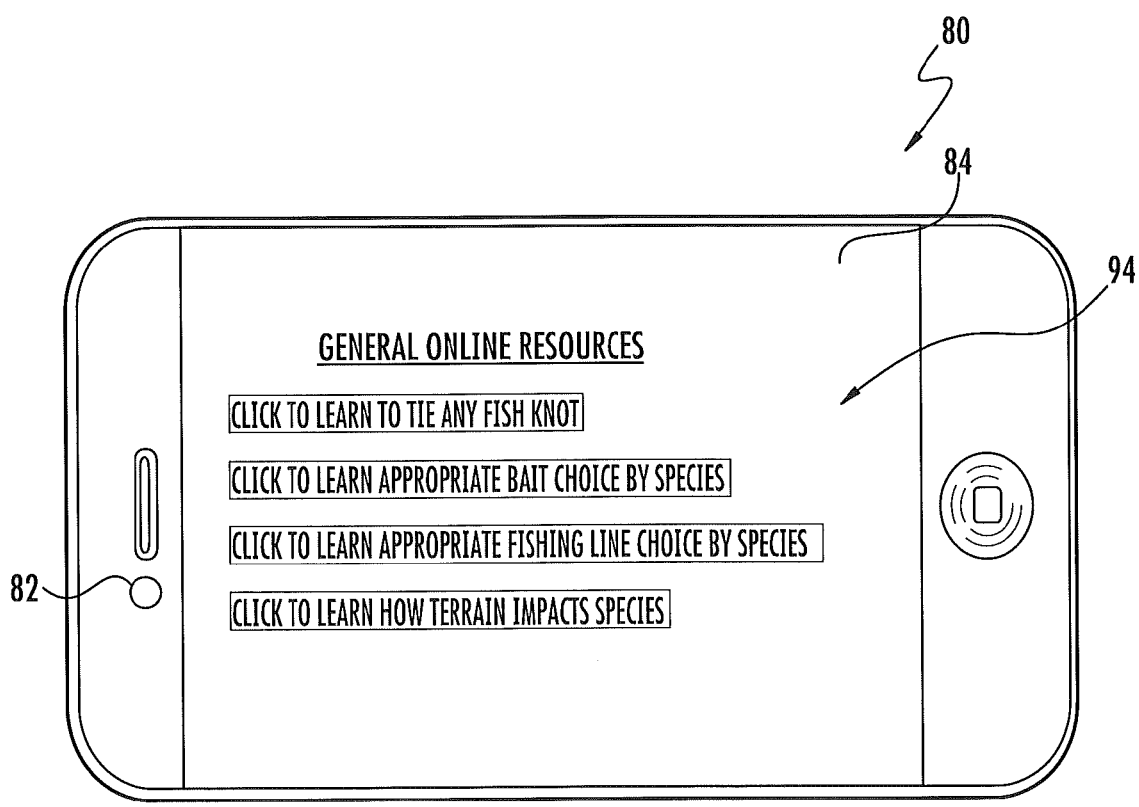
Figure 13:
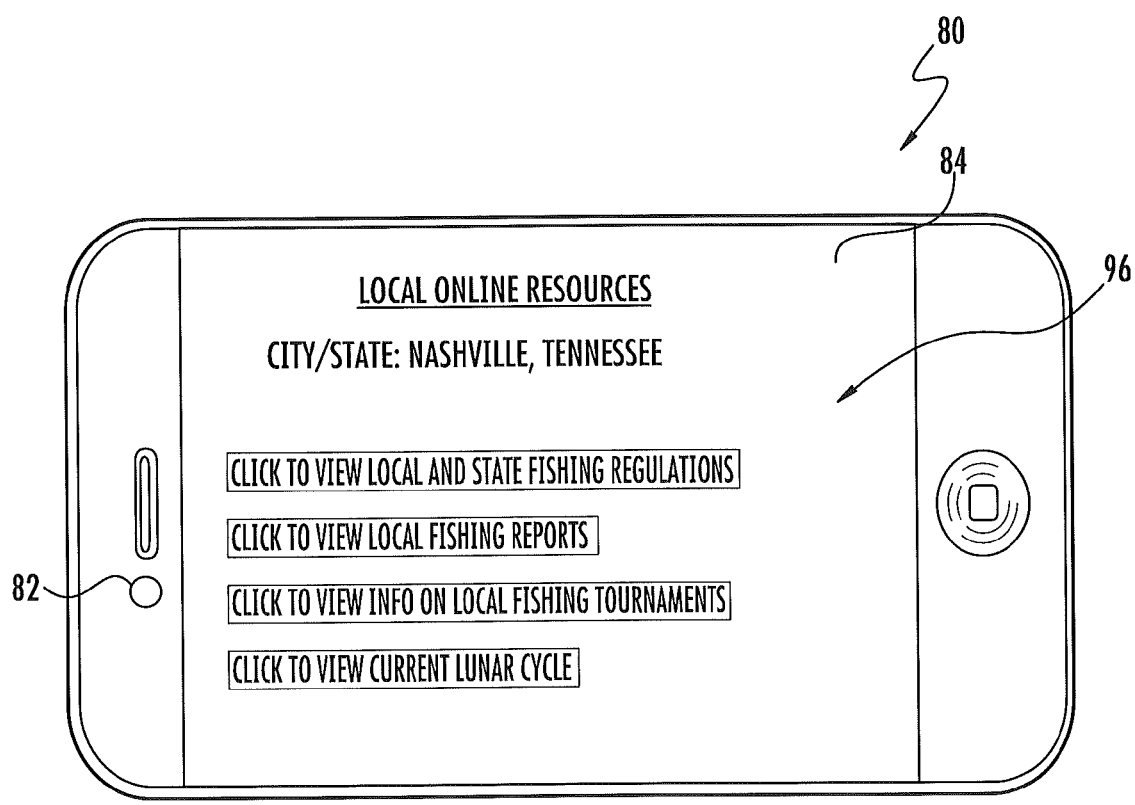

Referring to FIGS. 12 and 13, the remote device 80 may include a knowledge base containing information associated with an object for which data has been received from the handheld apparatus 10. For example, in a fishing application, the knowledge base may contain fishing regulation information, bait information, fishing knot information, fishing line size information, fish location information, fish species information, fishing lure information, fish recipes, and/or lunar cycle information for specific geographical locations. The user can access and search the knowledge base via a software application on the remote device 80. FIGS. 12 and 13 illustrate user interfaces 94, 96 displayed within the remote device display 84 that allows a user to access such a knowledge base. However, in some embodiments, a remote device 80 may not include a knowledge base, but may be configured to access information from other sources. For example, the user interfaces 94, 96 may allow a user to access various information from on-line resources via the Internet.

Figure 14:
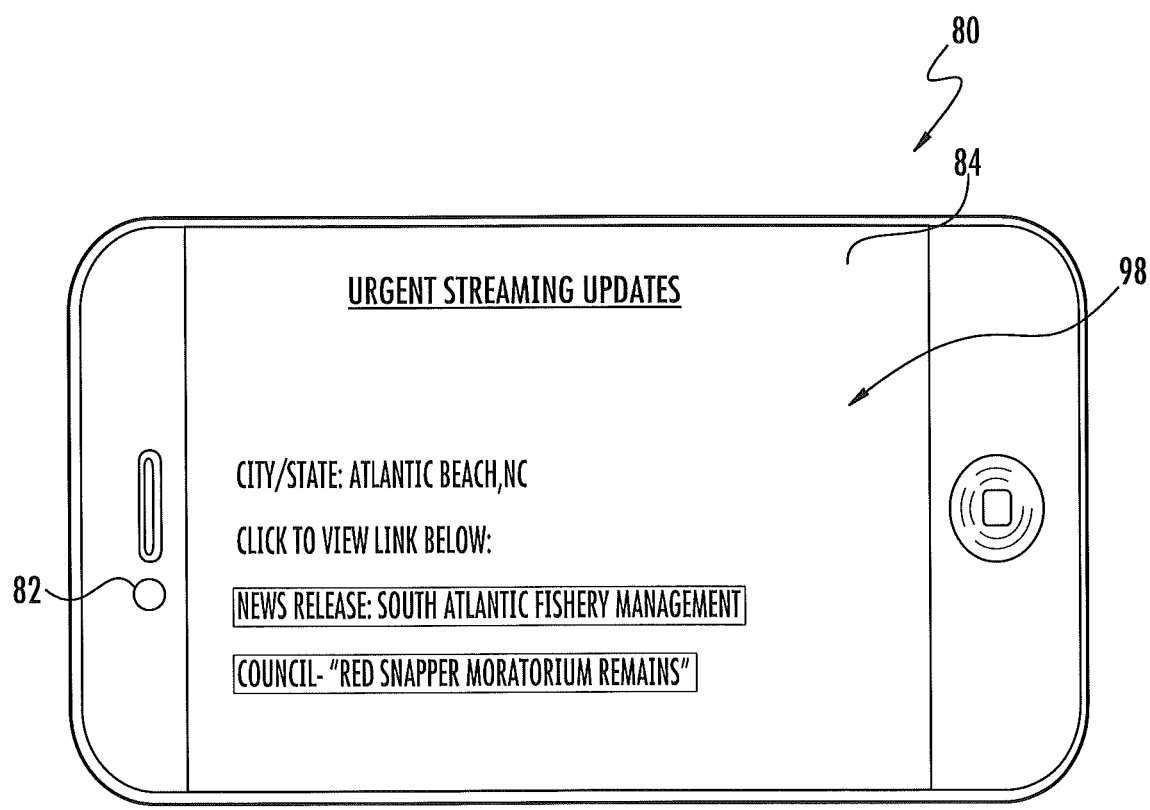

Referring to FIG. 14, the remote device 80 may be configured to receive information from various sources and display the information within the device display 84. As illustrated in the user interface 98 of FIG. 14, urgent updates about new or late breaking regulations or catch quota issues affecting certain species of fish may be displayed.

Figure 15:
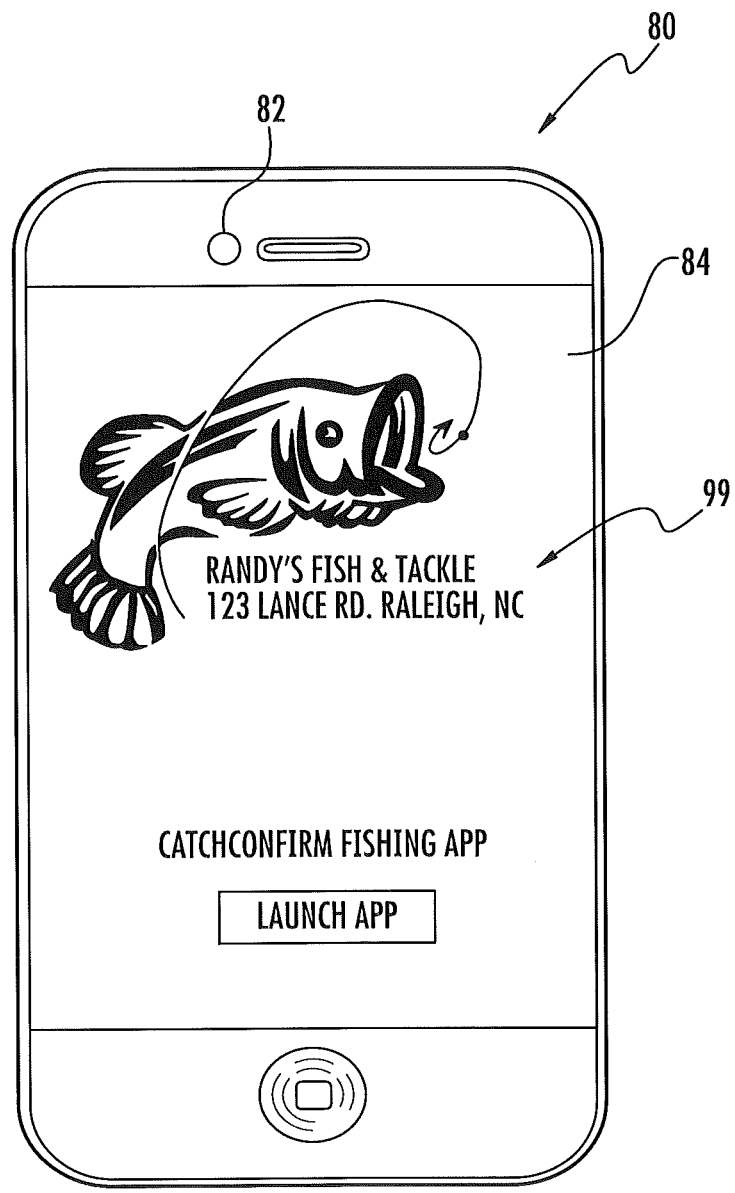

Referring to FIG. 15, in some embodiments of the present invention, the remote device 80 includes a software application that is configured to receive and display advertising for goods and/or services related to an object for which data has been received from the handheld apparatus 10. The software application may be configured identify what type of object is displayed and then seek advertising from one or more sources that is related to the object. In some embodiments, the advertising may be for goods and/or services that are offered for sale within a predetermined distance of a geographical location of the remote device 80.

FIG. 15 illustrates a fish and tackle store advertisement 99 displayed within the remote device display 84 in response to the software application detecting the image of a fish. The fish and tackle store represented in the advertisement may be located within a predetermined distance of a geographical location of the remote device 80. The fish and tackle store represented in the advertisement may also offer products/services that are specifically related to the type of fish displayed within the remote device 80. For example, a particular type of bait or lure may be best suited for fishing for the species of fish displayed via the remote device 80.

FIG. 16 illustrates an exemplary processor 300 and memory 302 that may be utilized by handheld apparatus 10 in implementing various embodiments of the present invention. However, embodiments of the present invention are not limited to a single processor and memory. Multiple processors and/or memory may be utilized, as would be understood by those skilled in the art.

The processor 300 communicates with the memory 302 via an address/data bus 304. The processor 300 also communicates with various components that may be included with the handheld apparatus 10 (e.g., a transmitter 314, a GPS receiver 316, environmental sensor(s) 318, a radio 320, a speaker 322, a length sensor 324). The processor 300 may be, for example, a commercially available or custom microprocessor or similar data processing device. The memory 302 is representative of the overall hierarchy of memory devices containing the software and data used to perform the various operations described herein. The memory 302 may include, but is not limited to, the following types of devices: cache, ROM, PROM, EPROM, EEPROM, flash, SRAM, and DRAM.

As shown in FIG. 16, the memory 302 may hold various categories of software and data: an operating system 306, a weight and data acquisition module 308, a weight and data display module 310, and a remote device camera operation module 312. The operating system 306 may manage the resources of one or more devices used to implement embodiments of the present invention and may coordinate execution of various programs (e.g., the weight and data acquisition module 308, the weight and data display module 310, and the remote device camera operation module 312) by the processor 300. The operating system 306 can be any operating system suitable for use with a data processing system, such as IBM®, OS/2®, AIX® or z/OS® operating systems, Microsoft® Windows® operating systems, iOS®, Android®, Unix or Linux™, etc.

The weight and data acquisition module 308 comprises logic for determining the weight of an object suspended from the support member 22 and for receiving data from a user and/or other source. The weight and data acquisition module 308 may also comprise logic for determining the length of an object from an image of the object. The weight and data display module 310 comprises logic for displaying weight data within the display 30 and for displaying data from a user and/or other source within the display 30. The remote device camera operation module comprises logic for controlling the camera of a remote device 80 that is used to capture an image of an object suspended from the support member 22 of the handheld apparatus 10.

Figure 17:
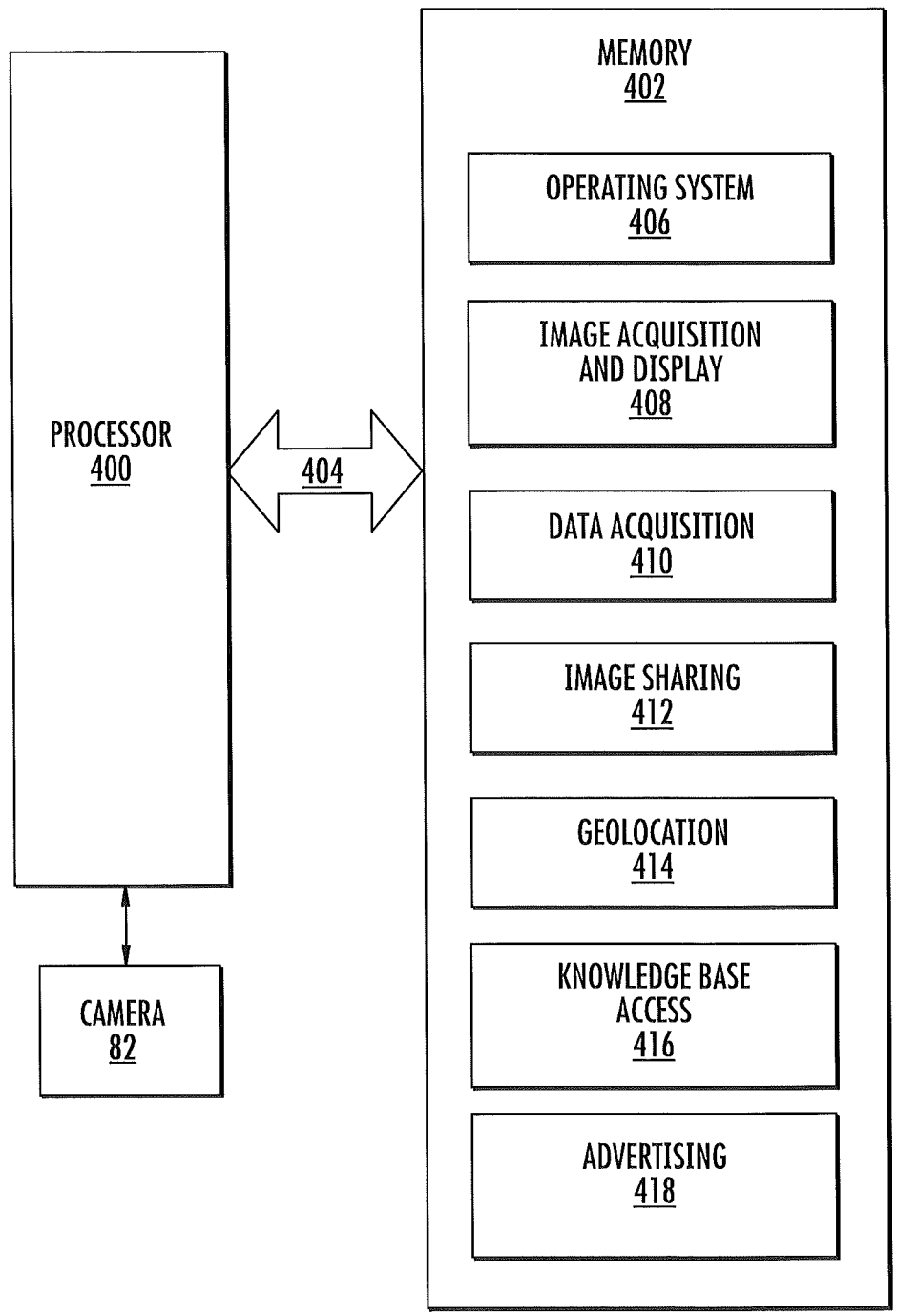
FIG. 17 illustrates an exemplary processor and memory that may be utilized by the remote device of FIG. 4 in implementing various embodiments of the present invention.

FIG. 17 illustrates an exemplary processor 400 and memory 402 that may be utilized by a remote device 80 in implementing various embodiments of the present invention. However, embodiments of the present invention are not limited to a single processor and memory. Multiple processors and/or memory may be utilized, as would be understood by those skilled in the art.

The processor 400 communicates with the memory 402 via an address/data bus 404. The processor 400 may be, for example, a commercially available or custom microprocessor or similar data processing device. The memory 402 is representative of the overall hierarchy of memory devices containing the software and data used to perform the various operations described herein. The memory 402 may include, but is not limited to, the following types of devices: cache, ROM, PROM, EPROM, EEPROM, flash, SRAM, and DRAM.

As shown in FIG. 17, the memory 402 may hold various categories of software and data: an operating system 406, an image acquisition and display module 408, a data acquisition module 410, an image sharing module 412, a geolocation module 414, a knowledge base access module 416, and an advertising module 418. The operating system 406 may manage the resources of one or more components used to implement embodiments of the present invention and may coordinate execution of various programs (e.g., the image acquisition and display module 408, the data acquisition module 410, the image sharing module 412, the geolocation module 414, the knowledge base access module 416, and the advertising module 418) by the processor 400. The operating system 406 can be any operating system suitable for use with a data processing system, such as IBM®, OS/2®, AIX® or z/OS® operating systems, Microsoft® Windows® operating systems, iOS®, Android®, Unix or Linux™, etc.

The image acquisition and display module 408 comprises logic for capturing an image of an object via a camera of a remote device 80 and for displaying the image within a display of the remote device 80. The image acquisition and display module 408 may also comprise logic for editing an image within the display of the remote device 80.

The data acquisition module 410 comprises logic for receiving data from a user to be displayed and/or associated with an image displayed within the display of the remote device 80. The data acquisition module 410 may also comprise logic for determining the length of an object from an image of the object. The image sharing module 420 comprises logic for allowing users to share images with other devices and with various social media services. The geolocation module 414 comprises logic for determining a geographic location of the remote device 80 at the time an image is captured via the camera of the device 80.

The knowledge base access module 416 comprises logic for accessing various information, either locally stored on the device 80 or remotely stored, such as fishing regulation information, bait information, fishing knot information, fishing line size information, fish location information, fish species information, fishing lure information, fish recipes, and/or lunar cycle information for specific geographical locations. The advertising module 418 comprises logic for displaying advertising for goods and/or services related to an object for which data has been received from the handheld apparatus 10.

Figure 18:
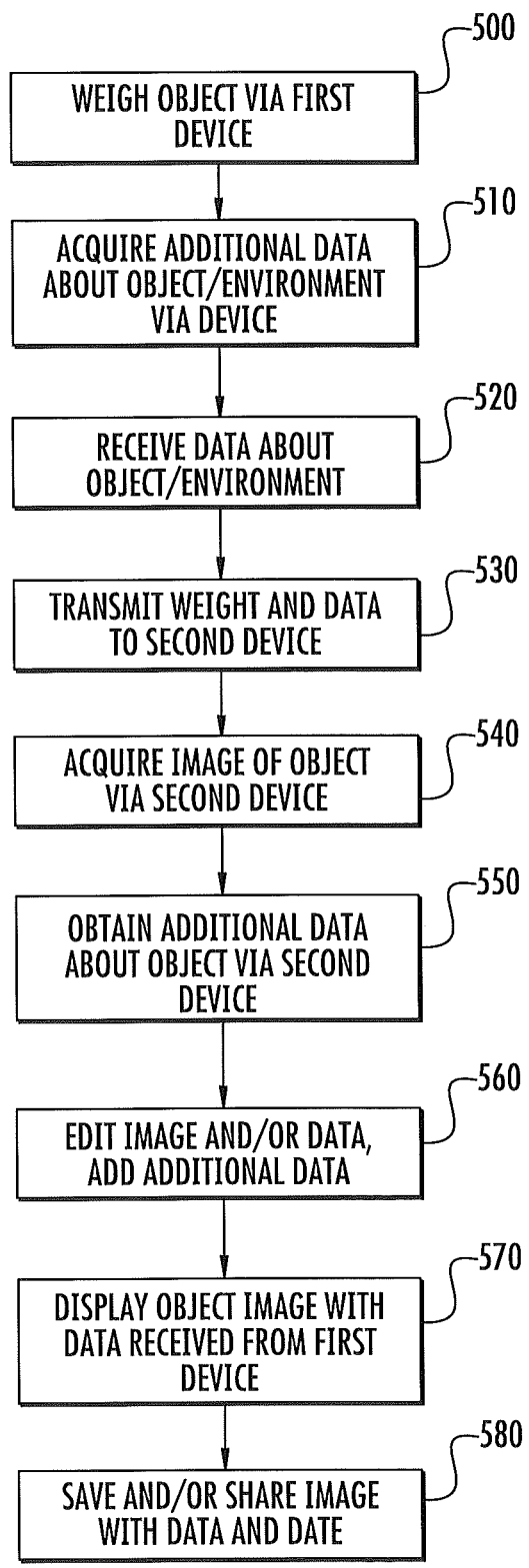
FIG. 18 is a flowchart of operations for utilizing the apparatus of FIGS. 1A-1C in combination with the remote device of FIG. 4, according to some embodiments of the present invention.

An exemplary process for acquiring and displaying object data, in accordance with some embodiments of the present invention, is now described with respect to FIG. 18. A user attaches an object (e.g., a caught fish) to the support member 22 of the handheld apparatus 10. Via user controls 40, 42, the user activates a weight sensor 20 associated with the support member 22 and weighs the object (Block 500). Additional data about the object and/or environment may be acquired via the handheld apparatus 10 (Block 510). For example, the handheld apparatus 10 may include one or more environmental sensors configured to obtain environmental condition information in a vicinity if the object and/or a GPS receiver configured to determine a geographical location of the object. In some embodiments, additional data about the object and/or environment may be entered by a user via the handheld device user interface and display 30 (Block 520). Time and date information may be entered by a user or automatically by the apparatus 10.

The object weight data and any additional data is transmitted wirelessly to a second handheld apparatus 80, such as a mobile phone, smart phone, tablet computer, personal digital assistant, etc. (Block 530). The second handheld apparatus 80 has a camera 82 and is used to capture an image of the object (Block 540). The second handheld apparatus may be used to acquire additional information about the object (Block 550). For example, the second handheld apparatus may include a software application that can interpolate a length of the object via the image. The second handheld apparatus may be configured to detect a geographical location when the image of the object is acquired. In some embodiments, the second handheld apparatus may include a knowledge base containing information associated with an object and a software application for searching and retrieving information from the knowledge base. Alternatively, the second handheld apparatus may be configured to access information about an object from one or more remotely located reference sources.

The acquired image of the object may be edited via a software application of the second handheld apparatus and/or additional data may be added to the object image (Block 560). The object image is displayed with weight data received from the handheld apparatus 10 and with any additional data acquired about the object, the environment, etc. (Block 570). The object image and data associated therewith can be saved and/or shared with other devices (Block 580).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. The invention is defined by the following claims, with equivalents of the claims to be included therein.

That which is claimed is:

1. In combination, first and second handheld apparatus; wherein the first handheld apparatus comprises:
    a handle comprising opposite proximal and distal free end portions;
    a weight sensor configured to weigh an object, the weight sensor comprising a support member extending outwardly from the handle distal free end portion that is configured to suspend an object therefrom for weighing via the weight sensor;
    a display integrated within the handle proximal free end portion and visible through the handle proximal free end, wherein the display is configured to display weight data of the object as measured by the weight sensor, and wherein the display is not movable relative to the handle; and
    a wireless transmitter configured to wirelessly transmit the object weight data from the weight sensor to the second handheld apparatus; and
    a plurality of user controls adjacent the display at the handle proximal free end portion, wherein the plurality of user controls in combination with the display serve as a user interface that allows a user to control operation of the weight sensor, and that allows a user to enter and display descriptive information; and
  wherein the second handheld device is a mobile phone, smart phone, a tablet computer, or a personal digital assistant and comprises:
    a camera; and
    a display configured to display an image of the object taken by the camera with the object weight data received from the first handheld apparatus;
  wherein the first handheld apparatus is configured to transmit a prompt to a user of the second handheld apparatus to take a picture of the object via the camera substantially simultaneously with, or subsequently to, the transmission of the object weight data to the second handheld apparatus.

2. The combination of claim 1, wherein the second handheld apparatus comprises a software application that allows a user to edit the image.

3. The combination of claim 1, wherein the second handheld apparatus comprises a software application that is configured to interpolate a length of the object via an image of the object taken by the camera.

4. The combination of claim 1, wherein the second handheld apparatus comprises a software application that allows a user to enter and display descriptive information with an image of the object.

5. The combination of claim 1, wherein the second handheld apparatus comprises a software application that allows a user to operate the camera of the second handheld apparatus via the first handheld apparatus.

6. The combination of claim 1, wherein the first handheld apparatus is configured to identify a third handheld apparatus within the predetermined proximity, prompt a user of the first handheld apparatus of the presence of the third handheld apparatus, and wirelessly transmit the object weight data to the third handheld apparatus in response to user authorization.

7. The combination of claim 1, wherein the first handheld apparatus is configured to receive and store images from the second handheld apparatus.

8. The combination of claim 1, wherein the second handheld apparatus comprises a software application that is configured to detect a geographical location of the second handheld apparatus when an image of the object is taken by the camera, to display a map via the display, and to display an icon on the map representative of the geographical location.

9. The combination of claim 1, wherein the second handheld apparatus comprises a knowledge base containing information associated with the object and/or is configured to access information about the object from one or more remotely located reference sources.

10. The combination of claim 9, wherein the object is a fish, and wherein the knowledge base contains fishing regulation information, bait information, fishing knot information, fishing line size information, fish location information, fish species information, fishing lure information, fish recipes, and/or lunar cycle information for specific geographical locations.

11. The combination of claim 1, wherein the second handheld apparatus is configured to display advertising for goods and/or services related to the object.

12. The combination of claim 1, wherein the second handheld apparatus is configured to display advertising for goods and/or services related to the object and that are offered for sale within a predetermined distance of a geographical location of the second handheld device.

13. The combination of claim 1, wherein the handle proximal free end portion is enlarged relative to other portions of the handle and has a non-movable angled face, and wherein the display is visible through the angled face.

* * * * *